H. JACOB & E. BERNICK.
ATTACHING DEVICE FOR OPTICAL INSTRUMENTS.
APPLICATION FILED JUNE 10, 1909.
1,001,958.
Patented Aug. 29, 1911.
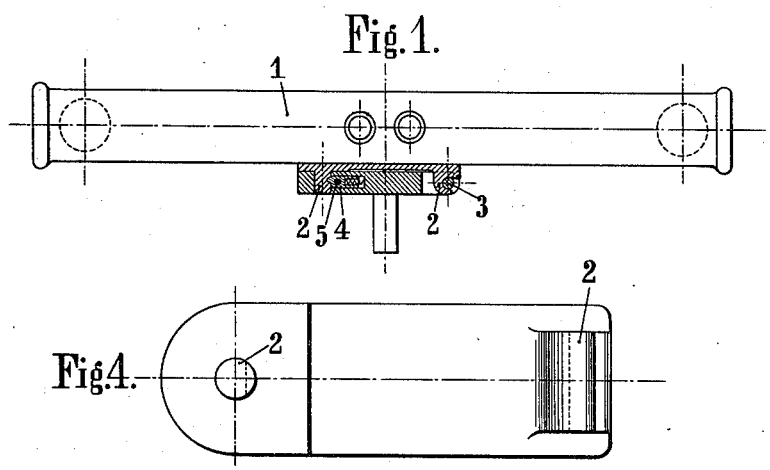
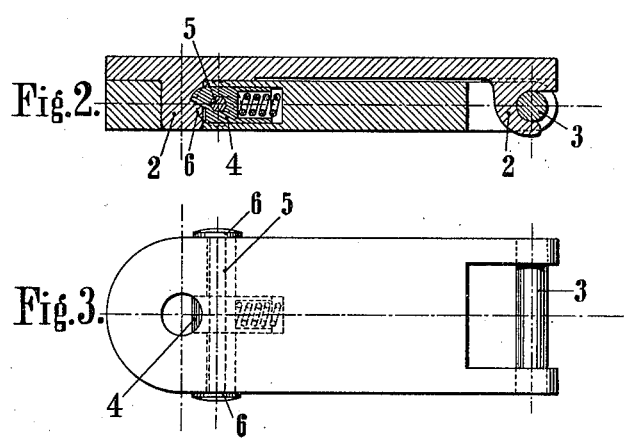

UNITED STATES PATENT OFFICE.

HEINRICH JACOB, OF STEGLITZ, NEAR BERLIN, AND ERNST BERNICK, OF FRIEDENAU, NEAR BERLIN, GERMANY, ASSIGNORS TO THE FIRM OF OPTISCHE ANSTALT C. P. GOERZ AKTIENGESELLSCHAFT, OF FRIEDENAU, NEAR BERLIN, GERMANY.

ATTACHING DEVICE FOR OPTICAL INSTRUMENTS.

1,001,958.     Specification of Letters Patent.     Patented Aug. 29, 1911.

Application filed June 10, 1909. Serial No. 501,398.

*To all whom it may concern:*

Be it known that we, HEINRICH JACOB and ERNST BERNICK, citizens of the German Empire, residing at 32$^a$ Holsteinischestrasse, Steglitz, near Berlin, Germany, and 14 Büsingstrasse, Friedenau, near Berlin, Germany, respectively, have invented certain new and useful Improvements in Attaching Devices for Optical Instruments, of which the following is a specification.

The present invention relates to an improved device for fastening, to tripods and other stands, optical instruments, which have their main tubes transverse to the line of sight, more particularly telemeters and stereo-telescopes.

The improved device comprises two pairs of coacting abutments attached to the instrument and stand respectively, one of the abutments being movable to allow of making a locked engagement, and the abutments being so positioned that an imaginary straight line connecting the two members of either pair is transverse to the line of sight of the instrument. With this arrangement it is possible to very easily effect the attachment and disconnection of the instrument, it being only necessary for that purpose to rotate the instrument in a plane transverse to the line of sight, and the operator can do this with one hand while making a preliminary survey of the field of view with the naked eye. The arrangement of the abutments on the transverse tube allows of placing them sufficiently far apart to secure a stable rest. The movable abutment is preferably carried by the stand, so that the instrument need not have, or carry, a comparatively large protuberance which in any way interferes with its insertion into its case.

The invention is illustrated in the annexed drawings, in which—

Figure 1 is an end view of a telemeter or stereo-telescope with the fastening device shown in section. Fig. 2 shows the fastening device on a larger scale, in section. Fig. 3 is a top plan view of the plate on which the instrument is mounted on the stand. Fig. 4 is a bottom plan view of a plate attached to the instrument, and carrying two of the abutments.

In the drawing 1 represents the instrument, to the under-part of which is fixed a plate having two downward projections or abutments 2. The plate at the top of the stand also carries two abutments, viz., a transverse pin or bar 3 and a spring-pressed catch 4, the bar and catch being adapted to engage recesses in the abutments 2. The recess in the abutment 2, engaged by the bar 3, is semi-cylindrical, so that the abutment can rotate on the bar. The catch 4 is slidable in a recess within the plate and is traversed by a pin 5 having heads 6 at its ends; the pin is movable in a transverse slot in the plate.

In order to fasten the instrument to the stand, the abutment 2 at the right hand end of the plate is engaged with the bar 3, the instrument being held in an inclined position, and then the left hand end of the instrument is depressed so that the other abutment 2, entering an aperture in the plate on the stand, first pushes back the catch 4 and is then engaged by the latter, so that the instrument is locked upon the stand. For disconnecting the instrument again, the catch is disengaged from the left hand abutment 2 by hand, the heads 6 serving as handles for this purpose.

For convenience in using the fastening device it is desirable that the catch 4 is nearest to the lefthand side of the operator having the instrument in front of him, so that while holding the instrument in his right hand the operator can easily engage the right-hand abutment 2 with the bar 3 and then depress the left-hand end of the instrument.

What we claim is:

A device for fastening to a stand an optical instrument having its main tube transverse to the line of sight, comprising abutments, arranged in pairs, attached to the instrument and stand respectively, and adapted to be brought into engagement with each other, the two abutments connected to the instrument being so positioned that an imaginary straight line connecting same is substantially transverse to the line of sight, one of said abutments being arranged to form a joint connection with the corresponding abutment of the stand.

In testimony whereof we have signed this specification in the presence of two subscribing witnesses.

HEINRICH JACOB.
ERNST BERNICK.

Witnesses:
WOLDEMAR HAUPT,
HENRY HASPER.

Copies of this patent may be obtained for five cents each, by addressing the "Commissioner of Patents, Washington, D. C."